(12) United States Patent
Espig et al.

(10) Patent No.: US 10,773,711 B2
(45) Date of Patent: Sep. 15, 2020

(54) ENGINE SOUND GENERATION AS TRANSMISSION SHIFTING AID FOR A HYBRID ELECTRIC VEHICLE

(71) Applicant: FORD GLOBAL TECHNOLOGIES, LLC, Dearborn, MI (US)

(72) Inventors: Markus Espig, Aachen NRW (DE); Matthew Allen Schneider, Aachen NRW (DE); Tobias Emig, Gelsenkirchen (DE); Julian David Pott, Aachen NRW (DE); Markus Wilmes, Aachen NRW (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/385,969

(22) Filed: Apr. 16, 2019

(65) Prior Publication Data
US 2019/0315338 A1    Oct. 17, 2019

(30) Foreign Application Priority Data

Apr. 17, 2018    (DE) .................. 10 2018 205 818

(51) Int. Cl.
*B60W 20/30*    (2016.01)
*B60K 6/547*    (2007.10)
(Continued)

(52) U.S. Cl.
CPC .............. *B60W 20/30* (2013.01); *B60K 6/547* (2013.01); *B60W 50/14* (2013.01); *B60K 6/48* (2013.01)

(58) Field of Classification Search
CPC .. B60K 2006/4808; B60K 6/38; B60K 6/387; B60K 6/48; B60K 6/485; B60K 6/52; B60K 6/54; B60K 6/547; B60W 2050/143; B60W 50/14; B60W 20/19; B60W 20/30; B60W 2510/0208; B60W 2510/0638;
(Continued)

(56) References Cited

U.S. PATENT DOCUMENTS 8,620,001 B2    12/2013    Peachey et al.
8,730,027 B2    5/2014    Saito et al.
(Continued)

FOREIGN PATENT DOCUMENTS

DE    102010022912 A1    12/2011
DE    102013213471 A1    1/2014
(Continued)

OTHER PUBLICATIONS

DE Examination Report DE 10 2018 205 818.0 Filed Dec. 13, 2018. 8 pages.

*Primary Examiner* — Jacob S. Scott
(74) *Attorney, Agent, or Firm* — Brooks Kushman PC; David Kelley

(57) ABSTRACT

A hybrid electric vehicle having an internal combustion engine and an electrical machine operable as a traction motor with a manual transmission arranged between the engine and the driving wheels and a clutch between the engine and the transmission generates an acoustic notification signal to indicate a gear shift that would result in either an excessive or insufficient engine speed. A different acoustic tone may be provided for a gear shift that would result in excessive engine speed than a gear shift that would result in insufficient engine speed. The acoustic notification signal may be a simulated engine noise.

20 Claims, 3 Drawing Sheets

(51) Int. Cl.
*B60W 50/14* (2020.01)
*B60K 6/48* (2007.10)

(58) Field of Classification Search
CPC ......... B60W 2510/1005; B60W 30/184; F16H 63/42; F16H 2063/426
See application file for complete search history.

(56) References Cited

U.S. PATENT DOCUMENTS

| | | |
|---|---|---|
| 8,942,878 B2 | 1/2015 | Schuessler |
| 9,074,683 B2 | 7/2015 | Sato et al. |
| 9,333,911 B2 | 5/2016 | Hera et al. |
| 2014/0328494 A1 | 11/2014 | Pommerer et al. |
| 2015/0199955 A1 | 6/2015 | Draganic |
| 2017/0217331 A1 | 8/2017 | Valeri et al. |

FOREIGN PATENT DOCUMENTS

| | | |
|---|---|---|
| DE | 102013210895 A1 | 12/2014 |
| DE | 102016210895 A1 | 12/2017 |
| EP | 2090808 B1 | 8/2009 |

ENGINE SOUND GENERATION AS TRANSMISSION SHIFTING AID FOR A HYBRID ELECTRIC VEHICLE

CROSS-REFERENCE TO RELATED APPLICATIONS

This application claims foreign priority benefits under 35 U.S.C. § 119(a)-(d) to DE Application 10 2018 205 818.0 filed Apr. 17, 2018, which is hereby incorporated by reference in its entirety.

TECHNICAL FIELD

The disclosure relates to a hybrid electric vehicle and a method for operating a hybrid electric vehicle having a parallel hybrid drive train with an internal combustion engine and an electric machine as a traction motor.

BACKGROUND

A hybrid electric vehicle (HEV) is understood to be a motor vehicle that is driven by a hybrid drive having at least one electrical machine and an internal combustion engine, such as an Otto or Diesel engine. It draws the energy from a storage device for electrical energy in the motor vehicle and from an operating fuel tank. A hybrid electric vehicle such as this is also known as a hybrid vehicle, hybrid car or vehicle with a hybrid drive.

The hybrid drive is employed to improve efficiency, to reduce the use of fossil fuels or to increase power in the low engine speed range. An electrical power supply to the vehicle is possible in the configuration as a plug-in hybrid.

In a parallel hybrid drive, there is an operating mode in which the electrical machine and the internal combustion engine act upon the drive train at the same time, which sums the torques of the individual drives. This permits a less powerful design for all engines, which reduces costs, weight and installation space, as well as fuel in the case of the internal combustion engine, by downsizing. Parallel hybrids can be implemented comparatively cost-effectively as mild hybrids. If a purely electrical driving mode should also be possible, the electric motor must be designed accordingly.

If the electrical machine is connected to the driving wheels of the hybrid electric vehicle in a force-transmitting manner, and if a manual transmission is arranged between the internal combustion engine and the driving wheels and a clutch is provided between the internal combustion engine and the manual transmission, then the internal combustion engine can be separated from the drive train by opening the clutch, whereupon only the electrical machine, operated as a motor, provides propulsion in the driving direction. Thus, the internal combustion engine does not have to be coupled during purely electrical operation. Here the electrical machine can be coupled without a clutch—i.e. rigidly—to the driving wheels, or the electrical machine can be coupled to the driving wheels via a clutch, a freewheel clutch or a shiftable transmission. The electrical machine can drive the motor vehicle while the internal combustion engine is not engaged, i.e. the clutch associated with the internal combustion engine is open.

However, depending upon the gear of the manual transmission that is engaged, the situation can arise that a closing of the clutch results in a speed increase in the internal combustion engine, which can damage the engine, or the closing of the clutch results in a speed decrease in the internal combustion engine to a value below a minimum operating speed that stalls the engine.

SUMMARY

A method for operating a hybrid electric vehicle having a parallel hybrid drive train with an internal combustion engine and an electrical machine that, when operated as a motor, serves as a traction motor, wherein the electrical machine is connected to driving wheels of the hybrid electric vehicle in a force-transmitting manner, and wherein a manual transmission is arranged between the internal combustion engine and the driving wheels, wherein a clutch is provided between the internal combustion engine and the manual transmission, includes detecting whether the clutch is open, detecting an engaged gear of the manual transmission, detecting an operating parameter for the electrical machine, which is operated as a motor, evaluating the engaged gear of the manual transmission and the detected operating parameter of the electrical machine operated as a motor in order to determine a reference value for the internal combustion engine, evaluating the reference value, in particular by comparing the reference value to at least one threshold value, and generating at least one notification signal, in particular to indicate a gear shift that violates the threshold value by the reference value.

The method thus relates to electric hybrid vehicles having a parallel hybrid drive train, such as a P3 or P4 configuration, and a manual transmission. The electrical machine can be rigidly coupled to the driving wheels, or the electrical machine can be coupled to the driving wheels via a clutch, a freewheel clutch or a shiftable transmission. The electrical machine can drive the motor vehicle while the internal combustion engine is not engaged.

The operating parameter can be representative of the current engine speed of the electrical machine when operated as a motor, for example, while the reference value is indicative of the engine speed prevailing on the input side of the manual transmission. In other words, a speed difference between different components of the parallel hybrid drive train with an open clutch and the current gear selection, or a value that is representative of this, is determined, for which compensation would have to be made after closing the clutch. If this speed difference or representative value is too great, then a driver is prompted to shift gears, e.g. by the notification signal, so that the speed difference to be overcome is reduced by the gear shift. Additionally, or alternatively, instead of notifying the driver by the notification signal only when the threshold value has been exceeded, it is also possible that a confirmation of the calculated speed of the internal combustion engine is continuously generated, as well. The notification signal in this instance can also be an artificially generated speed-dependent engine sound.

According to one embodiment, an E clutch is used as the clutch. An E clutch (also called an automatic clutch system—ACS) is understood to be an independent clutch system for motor vehicle transmissions, in which the opening (disengagement) and closing (engagement) of the clutch is triggered by sensor signals and is actuated by auxiliary drives. Since the driver no longer directly carries out the clutch process, a clutch pedal is no longer required. Therefore, the operation of the electric hybrid vehicle is simplified, since a gear shift is immediately possible, without first actuating a clutch pedal.

According to a further embodiment, at least one notification signal is generated to indicate a gear shift that falls below the threshold value by the reference value. In this scenario, the closing of the clutch would cause the resulting speed of the hybrid drive train to be reduced to a value that lies below a minimum speed of the internal combustion engine. For example, a so-called choking of the internal combustion engine by the closing of the clutch can be avoided.

According to a further embodiment, at least one notification signal is generated to indicate a gear shift that exceeds the threshold value by the reference value. In this scenario, the closing of the clutch would cause the resulting speed of the hybrid drive train to be increased to a value that lies above a maximum speed of the internal combustion engine. For example, a so-called over-revving of the internal combustion engine can be avoided.

According to a further embodiment, at least one notification signal is an acoustic signal. A driver can thereby be informed of a necessary gear shift, even if corresponding display instruments are not within the driver's current field of vision. Moreover, a driver does not have to look away from current traffic events as with an optical display, which increases traffic safety.

According to a further embodiment, at least one first notification signal to upshift to a higher gear and a second notification signal to downshift to a lower gear are provided. In this way, the driver can be informed as to whether a downshift or upshift is necessary in the current situation. This is especially advantageous in so-called sequential manual transmissions, in which a gear cannot be freely selected, but rather only a downshift into the next lower gear and an upshift into the next higher gear are possible.

According to a further embodiment, the first notification signal has a higher frequency than the second notification signal. There is thus a direct association between the respective notification signals and their respective meanings, specifically higher tone—upshift and lower tone—downshift. The method thus has an especially intuitive character.

According to a further embodiment, a notification signal with a respective frequency is assigned to each gear. In other words, a notification signal with the lowest frequency is assigned to the first gear, a notification signal with a second-lowest frequency is assigned to the second gear, a notification signal with a third-lowest frequency is assigned to the third gear, etc. It is thereby possible to also lend an especially intuitive character to the method when a non-sequential transmission with free gear selection is used instead of a sequential transmission.

According to a further embodiment, the notification signal is a voice output. In this way, a driver can be directly prompted to shift to the gear stated in each case.

The disclosure further relates to a computer program product, a control device and a motor vehicle having a control device of this type.

One or more embodiments are explained on the basis of an illustration. The following is shown:

DETAILED DESCRIPTION

As required, detailed embodiments are disclosed herein; however, it is to be understood that the disclosed embodiments are merely representative of the claimed subject matter and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
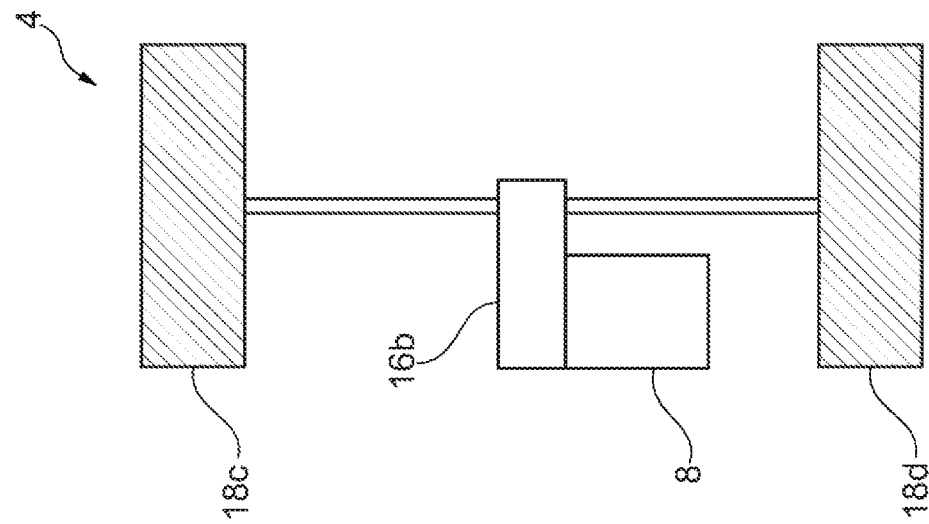
FIG. 1 is a schematic representation of a hybrid electric vehicle having a parallel front drive and a motor-driven rear drive according to one or more embodiments.
Figure 1:
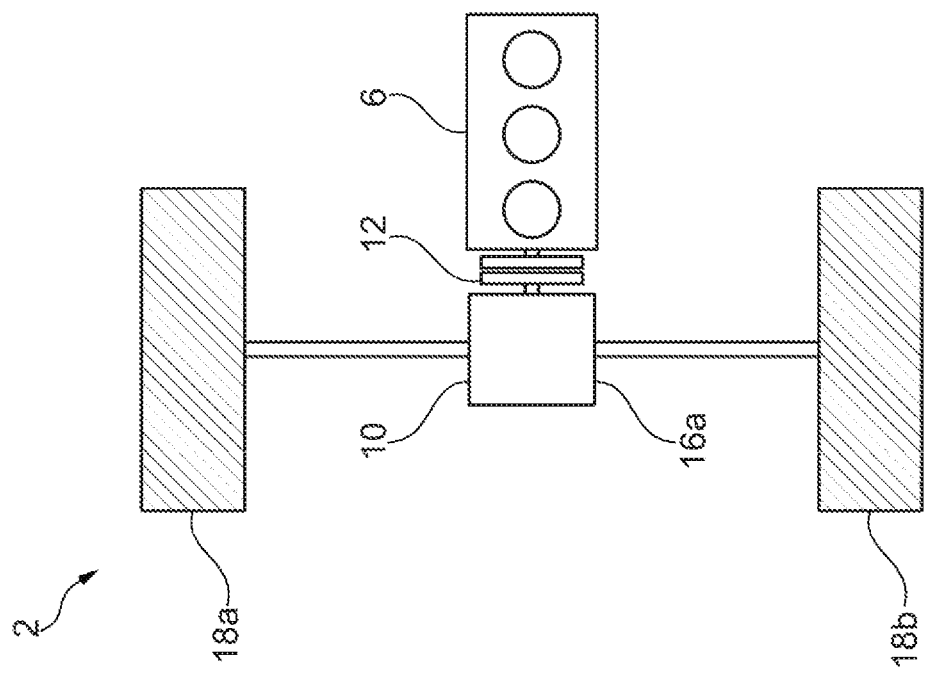

In the drawing of FIG. 1, a hybrid electric vehicle 2 is configured as a passenger car in the present representative embodiment. The hybrid electric vehicle 2 has a hybrid drive train 4, which in the present exemplary embodiment comprises an internal combustion engine 6, an electrical machine 8, a manual transmission 10, a clutch 12, a control device 14 (FIG. 3) as well as a first differential gear 16a and a second differential gear 16b. In the present embodiment, the internal combustion engine 6 is a Diesel engine that can also be turbocharged. Alternatively, the internal combustion engine 6 can also be an Otto engine, possibly also with turbocharging.

The internal combustion engine 6 powers the front driving wheels 18a, 18b of the hybrid electric vehicle 2 by means of the clutch 12 and the manual transmission 10 as well as a first differential gear 16a. The manual transmission 10 is a vehicle transmission in the hybrid drive train 4 of the electric hybrid vehicle that translates the engine speed of the internal combustion engine 6 to the drive speed of the driving wheels 18a, 18b and, to this end, provides multiple gears or steps and usually a reverse gear for driving backward, as well.

The manual transmission 10 can be configured as a non-sequential transmission or as a sequential transmission. Whereas one of the plurality of gears can be freely selected in a non-sequential transmission, shifting to a freely selected gear is not possible in a sequential transmission. It is possible only to shift into the next-highest or next-lowest gear—the next in the sequence. It is not possible to skip one or more gears.

The clutch 12 is a friction clutch, which can be disengaged during operation. This serves to interrupt the transfer of force between the internal combustion engine 6 and the manual transmission 10 when the gear is shifted or when the electric hybrid vehicle 2 should remain stationary with the internal combustion engine 6 running.

The clutch 12 is an E clutch in the present embodiment. An E clutch (also called an automatic clutch system—ACS) is understood to be an independent clutch system for motor vehicle transmissions, in which the opening (disengagement) and closing (engagement) of the clutch 12 is triggered by sensor signals and is actuated by auxiliary drives. Since the driver no longer directly carries out the clutch process, a clutch pedal is no longer required.

The electrical machine 8 can be operated both as a motor and as a generator. Thus, depending on operating mode, the electrical machine 8 can be used as a traction motor or as a generator for recuperating braking energy. The electrical machine 8 is a rotating electrical machine. The electrical machine 8 can be a direct current, an alternating current or a three-phase machine. Furthermore, the electrical machine 8 can be configured as a commutator, an asynchronous or a synchronous machine.

In the present embodiment, the electrical machine 8 drives the rear driving wheels 18c, 18d of the hybrid electric vehicle 2 using a second differential gear 16b without the interposition of a clutch when the electrical machine 8 is operated as a motor. In other words, the rear driving wheels 18c, 18d are firmly connected to the electrical machine 8. Deviating from the present embodiment, the electrical machine 8 can be coupled to the driving wheels via a clutch, a freewheel clutch or a shiftable transmission.

When during operation the internal combustion engine 6 drives driving wheels 18a, 18b, and the electrical machine 8 is operated as a motor at the same time and thus drives driving wheels 18c, 18d, the electrical machine 8 and the internal combustion engine 6 thus act upon different axles. The tensile force of the propulsion systems is overlaid onto the driving surface. This represents a parallel hybrid drive train arrangement of the hybrid drive train 4, which is also called a P4 configuration. One advantage of the P4 configuration is an all-wheel drive that is simple to implement.

A parallel hybrid drive train arrangement is understood here to mean that an electrical path runs parallel to the path of the internal combustion engine, and the output of the two systems is at least temporarily mechanically superimposed to drive the hybrid electric vehicle 2. In contrast to the serial hybrid drive, there is a direct mechanical drive shaft from the internal combustion engine 6 to the driving wheels 18a, 18b (not shown), whereby it is possible to drive the hybrid electric vehicle 2 directly by means of the internal combustion engine 6 without the conversion losses of a serial configuration. A further parallel hybrid drive train arrangement of the hybrid drive train 4 will now be explained with reference to FIG. 2.

Figure 2:
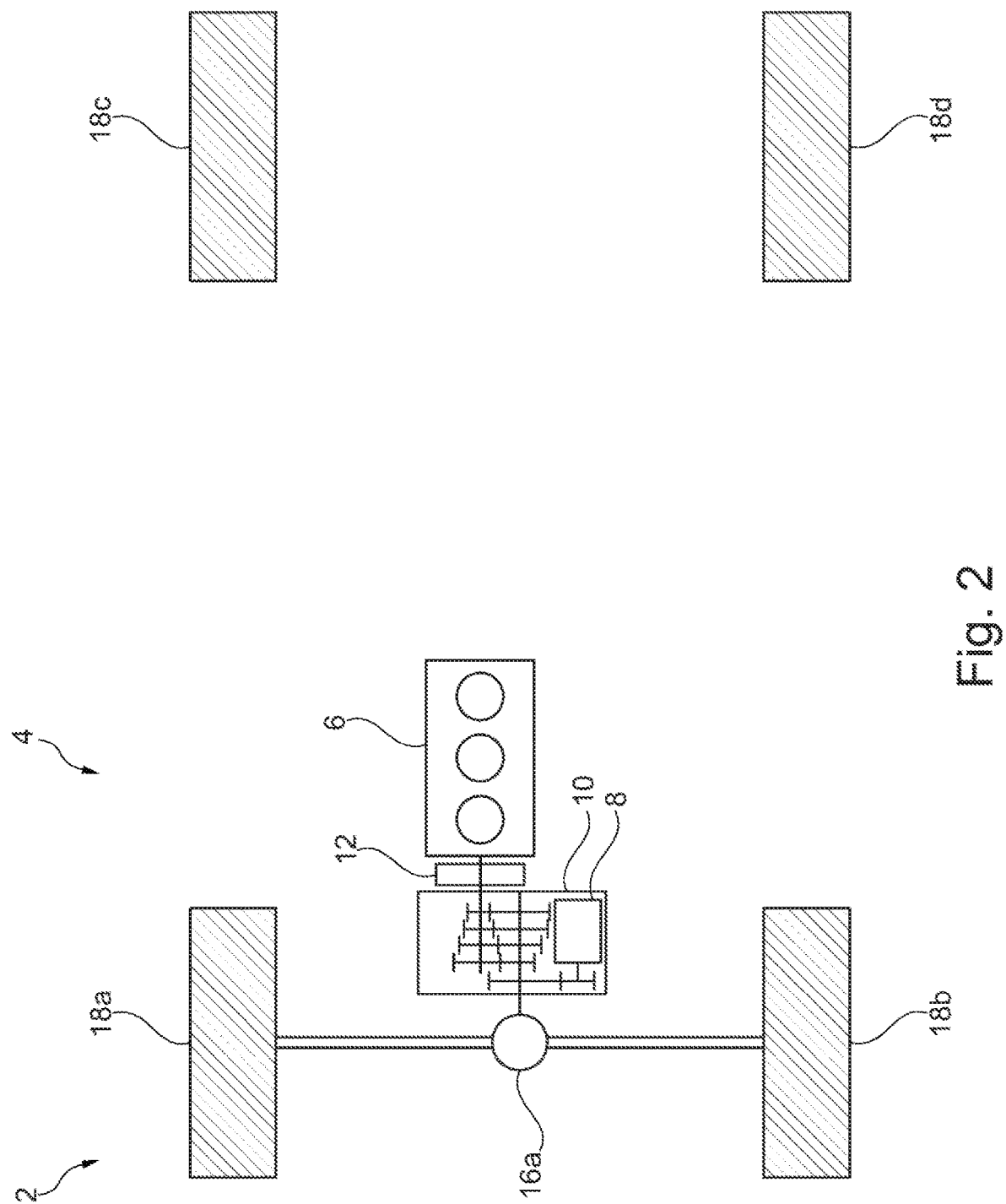
FIG. 2 is a schematic representation of a hybrid electric vehicle having a parallel front drive according to one or more embodiments.

The parallel hybrid drive train arrangement of the hybrid drive train 4 shown in FIG. 2 is a so-called P3 configuration. The clutch 12 connects to the internal combustion engine 6, the manual transmission 10 connects to the clutch, and the electrical machine 8 connects to the manual transmission and then drives the driving wheels 18a, 18b via a differential gear, which is not shown. Moreover, an energy storage device for electrical energy, such as a battery or rechargeable (plug-in) battery (not shown), is provided, which powers the electrical machine 8 that is operated as a motor and in which it is possible to temporarily store recuperation energy provided by the electrical machine 8 when it is operated as a generator.

The electrical machine 8 is thus arranged at the transmission output of the manual transmission 10. As a result, the power does not have to be conducted through the manual transmission 10 during electric operation and recuperation. However, the electrical machine 8 is governed by the output speed of the transmission and thus a significantly broader speed range. Deviating from the present embodiment, the electrical machine 8 can also be designed as a transmission-integrated electrical machine that is connected to an output shaft.

Figure 3:
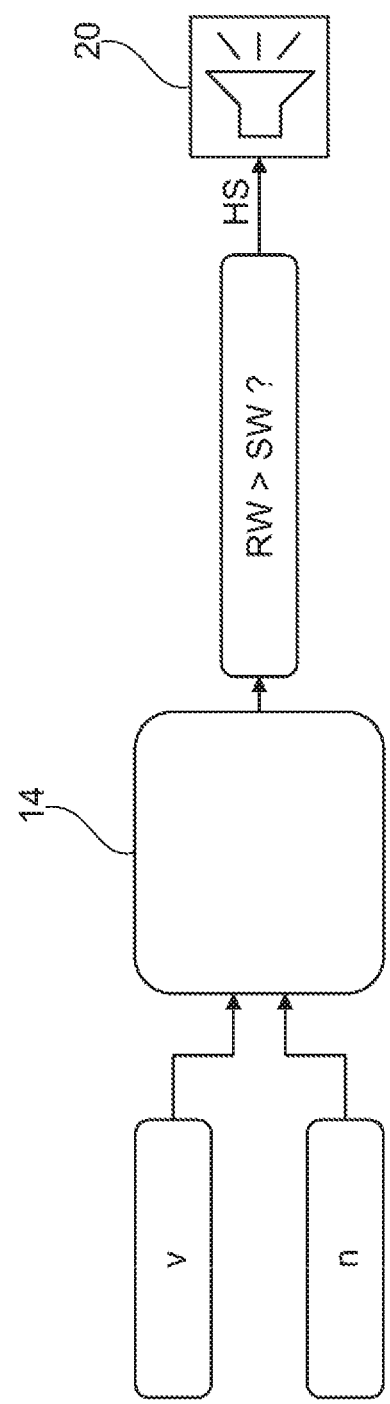
FIG. 3 is a schematic representation illustrating operation of a hybrid vehicle or method for operating the hybrid electric vehicles shown in FIGS. 1 and 2.

The function of the hybrid electric vehicle 2 shown in FIGS. 1 and 2 will now be explained with additional reference to FIG. 3. A controller, control module, or control device 14 controls the internal combustion engine 6 and the electrical machine 8 as well as the clutch 12 in such a way that, depending upon the operating mode and driving state, either the internal combustion engine 6 with the generator-operated electrical machine 8 only charges the energy storage device for electrical energy, or can be mechanically coupled to the driving wheels 18a, 18b, 18c, 18d. For these tasks and the functions described below, the control device 14 can have hardware and/or software components. Deviating from the present embodiment, a separate control device can also be provided (outside of the ECU, PCU, or VCU).

Since the opening (disengaging) and closing (engaging) of the clutch 12 is triggered by sensor signals and performed by auxiliary drives, it is possible to detect in a first step whether the clutch 12 is open by detecting activation signals for activating the auxiliary drives. To recognize which gear n has been engaged, two contactless rotation angle sensors are provided on the shift linkage of the manual transmission 10, for example. In addition to the sensor signals for detecting shift intention and gear recognition, the control device 14 also scans signals, for example, via a CAN-BUS from the control devices of the engine control and the ABS/ASR and ESP control. The gear n of the manual transmission 10 that has been engaged can thus be detected in a further step.

An operating parameter for the electrical machine 8 when operated as a motor can then be determined in a further step. The operating parameter is representative of the current speed of the electrical machine 8 when operated as a motor. It can be determined by detecting the speed itself, by evaluating commutation processes of a commutated electrical machine or by evaluating the vehicle velocity v.

In a further step, the engaged gear n of the manual transmission 10 and the detected operating parameter of the electrical machine 8 that is operated as a motor are evaluated to determine a reference value RW for the internal combustion engine 6. The reference value RW is therefore indicative of the speed of the manual transmission 10 on the input side.

In a further step, the reference value RW is compared to at least one threshold value SW. The threshold value in this instance is indicative of a speed that the internal combustion engine 6 can assume.

In a further step, a notification signal HS is generated to indicate a gear shift that violates the threshold value SW by the reference value RW.

A notification signal HS can be generated here when the threshold value SW falls below the reference value RW. The closing of the clutch 12 would cause the resulting speed of the hybrid drive train 4 to be reduced to a value that lies below a minimum speed of the internal combustion engine 6. In other words, closing the clutch 12 would result in a so-called choking of the internal combustion engine 6.

By means of the notification signal HS, which in the present embodiment is an acoustic notification signal that is emitted by a speaker 20, a driver of the hybrid electric vehicle 2 is prompted to shift the engaged gear n so that the resulting speed of the hybrid drive train 4 after the executed gear shift does not lead to the choking or stalling of the internal combustion engine 6.

Alternatively or additionally, the notification signal HS can be generated when the threshold value SW exceeds the reference value RW. Closing the clutch 12 would cause the resulting speed of the hybrid drive train 4 to be increased to a value that lies above a maximum speed of the internal combustion engine 6. In other words, closing the clutch 12 would result in a so-called over-revving of the internal combustion engine 6.

In addition, it is possible that a first notification signal and a second notification signal are provided. The first notification signal HS is indicative of an upshift into a higher gear, i.e. when the threshold value SW falls below the reference value RW, and the second notification signal HS is indicative of a downshift into a lower gear, i.e. when the threshold value SW exceeds the reference value RW.

When the manual transmission 10 is configured as a sequential manual transmission, it is possible that a higher frequency is assigned to the first notification signal HS than to the second notification signal HS. In that case, the first notification signal HS with the higher frequency is indicative of an upshift and the second notification signal HS with the lower frequency is indicative of a downshift.

If the manual transmission 10 is configured as a non-sequential manual transmission, it is possible that a notification signal HS with a respective frequency is assigned to each gear n. In other words, a notification signal with the lowest frequency is assigned to the first gear, a notification signal with a second-lowest frequency is assigned to the second gear, a notification signal with a third-lowest frequency is assigned to the third gear, etc. Alternatively, it may also be possible that the notification signal HS is a voice output, with which the driver is prompted to shift to the gear stated in each case.

It can be ensured in this way that a closing of the clutch 12 does not lead to a situation in which a closing of the clutch 12 results in a speed increase in the internal combustion engine 6, which can damage it, or in which the closing of the clutch results in a speed decrease in the internal combustion engine 6 to a value below a minimum operating speed.

While representative embodiments are described above, it is not intended that these embodiments describe all possible forms of the claimed subject matter. The words used in the specification are words of description rather than limitation, and it is understood that various changes may be made without departing from the spirit and scope of the disclosure. Additionally, the features of various implementing embodiments may be combined to form further embodiments that may not be explicitly illustrated or described.

What is claimed is:

1. A method for operating a vehicle having an electric machine and an engine coupled by a clutch to a manual transmission, comprising, by a controller:
   generating an acoustic signal to indicate a gearshift resulting in an engine speed being outside of a specified range in response to the electric machine operating as a motor and the clutch being open, the engine speed based on electric machine speed and an engaged gear of the manual transmission.

2. The method of claim 1 wherein the clutch is controlled by the controller.

3. The method of claim 1 wherein the acoustic signal has a first tone in response to the engine speed exceeding the specified range and a second tone in response to the engine speed being below the specified range.

4. The method of claim 1 wherein the acoustic signal simulates engine noise.

5. The method of claim 1 wherein the acoustic signal comprises a simulated speech signal.

6. The method of claim 5 wherein the simulated speech signal indicates an upshift to a higher gear or a downshift to a lower gear.

7. The method of claim 1 wherein the acoustic signal has a different frequency for each gear of the manual transmission.

8. A vehicle comprising:
   an engine;
   a manual transmission coupled to the engine by a clutch;
   an electric machine operable as a traction motor;
   a speaker; and
   a controller configured to generate an audio signal for the speaker when the clutch is open and the electric machine is operating as a traction motor in response to engine speed of the engine being above a first threshold or being below a second threshold, wherein the engine speed is based on a selected gear of the manual transmission and rotational speed of the electric machine.

9. The vehicle of claim 8 wherein the controller is configured to control opening and closing of the clutch.

10. The vehicle of claim 8 wherein the audio signal has different frequency associated with each gear of the manual transmission.

11. The vehicle of claim 8 wherein the audio signal has a first frequency indicative of the engine speed being above the first threshold and a second frequency indicative of the engine speed being below the second threshold.

12. The vehicle of claim 8 wherein the audio signal comprises a voice signal.

13. The vehicle of claim 8 wherein the audio signal comprises a simulated engine sound having a frequency corresponding to the engine speed.

14. A vehicle comprising:
   an internal combustion engine;
   an electric machine operable to drive the vehicle;
   a manual transmission having an input coupled to the internal combustion engine by a clutch and an output coupled to vehicle driving wheels; and
   a controller configured to:
      detect whether the clutch is open;
      detect an engaged gear of the manual transmission;
      detect an operating parameter of the electrical machine while operating as a traction motor to drive the vehicle; and
      generate a notification signal in response to a gear shift resulting in engine speed being outside a specified range, wherein the engine speed is based on the operating parameter of the electrical machine and the engaged gear of the manual transmission.

15. The vehicle of claim 14 further comprising a speaker, wherein the notification signal is an audio signal output by the speaker.

16. The vehicle of claim 15 wherein the audio signal has a different frequency for each gear of the manual transmission.

17. The vehicle of claim 15 wherein the audio signal is a voice signal.

18. The vehicle of claim 14 wherein the controller is configured to control the clutch.

19. The vehicle of claim 14 wherein the specified range is defined by an upper threshold and a lower threshold, and wherein the notification signal comprises a first frequency when the engine speed exceeds the upper threshold and comprises a second frequency lower than the first frequency when the engine speed is below the lower threshold.

20. The vehicle of claim 14 wherein the notification signal comprises an audio signal.

* * * * *